US010989077B2

(12) United States Patent
Romagnoli et al.

(10) Patent No.: US 10,989,077 B2
(45) Date of Patent: Apr. 27, 2021

(54) WASTE-TO-ENERGY PLANT

(71) Applicants: Nanyang Technological University, Singapore (SG); Università degli Studi di Udine, Udine (IT)

(72) Inventors: Alessandro Romagnoli, Singapore (SG); Fabio Dal Magro, Udine (IT); Gioacchino Nardin, Udine (IT)

(73) Assignees: Nanyang Technological University, Singapore (SG); Università degli Studi di Udine, Udine (IT)

( * ) Notice: Subject to any disclaimer, the term of this patent is extended or adjusted under 35 U.S.C. 154(b) by 194 days.

(21) Appl. No.: 16/092,196

(22) PCT Filed: Jun. 23, 2017

(86) PCT No.: PCT/SG2017/050314
§ 371 (c)(1),
(2) Date: Oct. 8, 2018

(87) PCT Pub. No.: WO2017/222476
PCT Pub. Date: Dec. 28, 2017

(65) Prior Publication Data
US 2020/0200047 A1 Jun. 25, 2020

(30) Foreign Application Priority Data
Jun. 23, 2016 (SG) .......................... 10201605197Q

(51) Int. Cl.
*F01K 3/18* (2006.01)
*C09K 5/06* (2006.01)
(Continued)

(52) U.S. Cl.
CPC .............. *F01K 3/185* (2013.01); *C09K 5/063* (2013.01); *C22C 21/02* (2013.01); *F01K 3/20* (2013.01);
(Continued)

(58) Field of Classification Search
CPC .......... C09K 5/063; C09K 5/06; C22C 21/02; F01K 3/185; F01K 3/20; F01K 3/247;
(Continued)

(56) References Cited

U.S. PATENT DOCUMENTS 3,662,716 A * 5/1972 Stevens ................. F22B 21/343
122/6 A
4,838,183 A * 6/1989 Tsaveras ................. F23G 5/002
110/101 C
(Continued)

FOREIGN PATENT DOCUMENTS

DE 102014202275 A1 8/2015
KR 1020130111889 A 10/2013
(Continued)

OTHER PUBLICATIONS

Foreign Communication from a Related Counterpart Application, International Search Report and Written Opinion dated Aug. 16, 2017, International Application No. PCT/SG2017/050314 filed on Jun. 23, 2017.

Primary Examiner — Steven B McAllister
Assistant Examiner — Benjamin W Johnson

(57) ABSTRACT

A Waste-to-Energy plant comprising: an incineration chamber in which waste is combusted generating flue gas; an economizer heating feedwater using heat from the flue gas; an evaporator producing steam from the heated feedwater using heat from the flue gas; a steam drum receiving heated feedwater from the economizer and supplying heated feedwater, the steam drum receiving steam from the evaporator and supplying steam; and a superheater receiving and heating steam from the steam drum to a superheated steam using heat from the flue gas; the incineration chamber comprising a first PCM-wall and a second PCM-wall each comprising a plurality of pipes and a layer of PCM provided between the pipes and the incineration chamber, the pipes in the first
(Continued)

PCM-wall receiving heated feedwater from the steam drum and producing additional steam therein and the pipes of the second PCM-wall additionally heating steam therein using radiant heat from the incineration chamber.

8 Claims, 3 Drawing Sheets

(51) Int. Cl.
| | |
|---|---|
| *C22C 21/02* | (2006.01) |
| *F01K 3/20* | (2006.01) |
| *F22G 1/02* | (2006.01) |
| *F23G 5/00* | (2006.01) |
| *F23M 5/08* | (2006.01) |
| *F28D 20/02* | (2006.01) |
| *F28D 21/00* | (2006.01) |
| *F28D 20/00* | (2006.01) |
| *F01K 3/24* | (2006.01) |

(52) U.S. Cl.
CPC ................. *F22G 1/02* (2013.01); *F23G 5/00* (2013.01); *F23M 5/08* (2013.01); *F28D 20/02* (2013.01); *F28D 21/001* (2013.01); *C09K 5/06* (2013.01); *F01K 3/247* (2013.01); *F23G 2206/203* (2013.01); *F28D 2020/0013* (2013.01); *F28D 2021/0024* (2013.01); *Y02E 20/12* (2013.01); *Y02E 60/14* (2013.01)

(58) Field of Classification Search
CPC ........ F22G 1/02; F23G 5/00; F23G 2206/203; F23M 5/08; F28D 20/02; F28D 1/001; F28D 2020/0013; F28D 2021/0024; Y02E 60/14; Y02E 20/12
USPC ........................................................ 122/7 R
See application file for complete search history.

(56) References Cited

U.S. PATENT DOCUMENTS

| | | | |
|---|---|---|---|
| 2009/0084327 A1* | 4/2009 | Cole .................... | F22B 37/025 122/2 |
| 2011/0083436 A1* | 4/2011 | White .................. | F28D 20/025 60/670 |
| 2015/0266144 A1* | 9/2015 | Bengaouer .............. | B23P 15/26 165/10 |

FOREIGN PATENT DOCUMENTS

| | | |
|---|---|---|
| KR | 101620034 B1 | 5/2016 |
| WO | 2008102191 A1 | 8/2008 |
| WO | 2017222476 A9 | 12/2017 |

\* cited by examiner

WASTE-TO-ENERGY PLANT

CROSS-REFERENCE TO RELATED APPLICATIONS

The present application is a filing under 35 U.S.C. 371 as the National Stage of International Application No. PCT/SG2017/050314, filed Jun. 23, 2017, entitled "WASTE-TO-ENERGY PLANT," which claims priority to Singapore Application No. SG 10201605197Q filed with the Intellectual Property Office of Singapore on Jun. 23, 2016 and entitled "WASTE-TO-ENERGY PLANT," both of which are incorporated herein by reference in their entirety for all purposes.

FIELD

This invention relates to a waste-to-energy plant.

BACKGROUND

In Waste-to-Energy (WtE) plants, hot flue gas generated during combustion of waste is used to produce steam by heating feedwater and thereby regain energy by using the steam to drive turbines or for other energy processes such as cogeneration. Heat recovery of thermal power in the gas generated during the combustion process is currently completely carried out by traditional steam generation boilers which usually comprise an incineration chamber having water-walls (i.e. radiant evaporators), as well as evaporators, economizers and superheaters that use heat from the hot flue gas as their energy source. In the economizer, feedwater is heated prior to being fed to the evaporator which produces steam by converting the heated feedwater into wet steam. The wet steam is then converted into dry steam and raised to useful temperatures by the superheater. Dry heated steam from the superheater is channelled to produce useful work as electricity and/or heat. The water-walls of the incineration chamber where combustion of waste takes place also absorb heat released during combustion and this heat is also used to evaporate feedwater into steam that is channelled into the superheater.

However, steam generation boilers suffer thermal power fluctuation due to the waste combustion being characterized by a high variability in net calorific value. This leads to a few technical issues which limit the maximum net electric efficiency achievable in existing WtE plants, namely:
  i. the maximum steam temperature achievable by the superheater is limited due to corrosion of the superheater occurring at high metal surface temperature; and
  ii. steam production by the evaporator fluctuates due to non-homogeneous composition of waste resulting in inconstant temperature of the hot flue gas that heats the feedwater into steam.

SUMMARY

Disclosed is a WtE energy plant developed around a technology based on Phase Change Material (PCM) capable of controlling steam temperature and steam production fluctuation by means of thermal energy storage. In the present system, the typical water-wall technology of existing boilers is replaced with a PCM-based technology capable of storing a variable heat flux coming from a high temperature heat source (i.e. the incineration chamber) and to release it on demand as a steady heat flux. This technique for heat storage allows designing thermal energy storage systems with a high energy density capable of storing heat at high temperature (>300° C.). By introducing the PCM-based technology, an extra degree of freedom is introduced in the heat recovery/management which did not exist before in combustion processes. The steady heat flux in the present system is used to avoid steam production fluctuation and to increase temperature of superheated steam over current corrosion limits (450° C.) without requiring the use of expensive coated superheaters. The PCM-based technology used in the present system has the potential to increase net electric efficiency above 30%, while still maintaining low maintenance costs and high plant availability.

According to a first aspect, there is provided a Waste-to-Energy plant comprising: an incineration chamber in which waste is combusted generating hot flue gas; at least one economizer to heat feedwater using heat from the hot flue gas; at least one evaporator to produce steam from the heated feedwater using heat from the hot flue gas; at least one steam drum to receive the heated feedwater from the at least one economizer and serve as a supply for the heated feedwater, the at least one steam drum further to receive the steam from the at least one evaporator and serve as a supply for the steam; and at least one superheater to receive the steam from the at least one steam drum and to further heat the steam to a superheated steam using heat from the hot flue gas; wherein the incineration chamber comprises a first PCM-wall and a second PCM-wall each comprising a plurality of pipes and a layer of PCM provided between the pipes and the incineration chamber, the plurality of pipes in the first PCM-wall receiving the heated feedwater from the steam drum and producing additional steam in the plurality of pipes in the first PCM-wall using radiant heat from the incineration chamber, and the second PCM-wall additionally heating steam in the plurality of pipes of the second PCM-wall using radiant heat from the incineration chamber to.

The PCM may comprise one of: aluminium and an inorganic eutectic aluminium alloy.

The steam in the plurality of pipes of the second PCM-wall may be superheated steam from the at least one superheater.

The superheater may be a low-pressure superheater, the steam in the plurality of pipes of the second PCM-wall may be the steam supplied from the steam drum, superheated steam from the second PCM-wall may be passed through a high pressure turbine, the superheater may receive and reheat steam from the high pressure turbine, and reheated steam from the superheater may be passed through a low pressure turbine.

The plant may further comprise a pump to control mass flow rate of steam between the first PCM-wall and the steam drum.

For at least one of the first PCM-wall and the second PCM-wall, the layer of PCM may be enveloped within a PCM-container, and the PCM-container may be made of at least one of: carbon steel having an $Al_2O_3$ coating, carbon steel having a WC—Co coating, a ceramic inert to molten aluminium and molten aluminium alloys, and microencapsulation.

The PCM-container facing the plurality of pipes may be shaped to conform to a shape of the plurality of pipes.

For at least one of the first PCM-wall and the second PCM-wall, an air gap may be provided between the layer of PCM and the plurality of pipes.

BRIEF DESCRIPTION OF FIGURES

In order that the invention may be fully understood and readily put into practical effect there shall now be described by way of non-limitative example only exemplary embodiments of the present invention, the description being with reference to the accompanying illustrative drawings.

DETAILED DESCRIPTION

Figure 1:
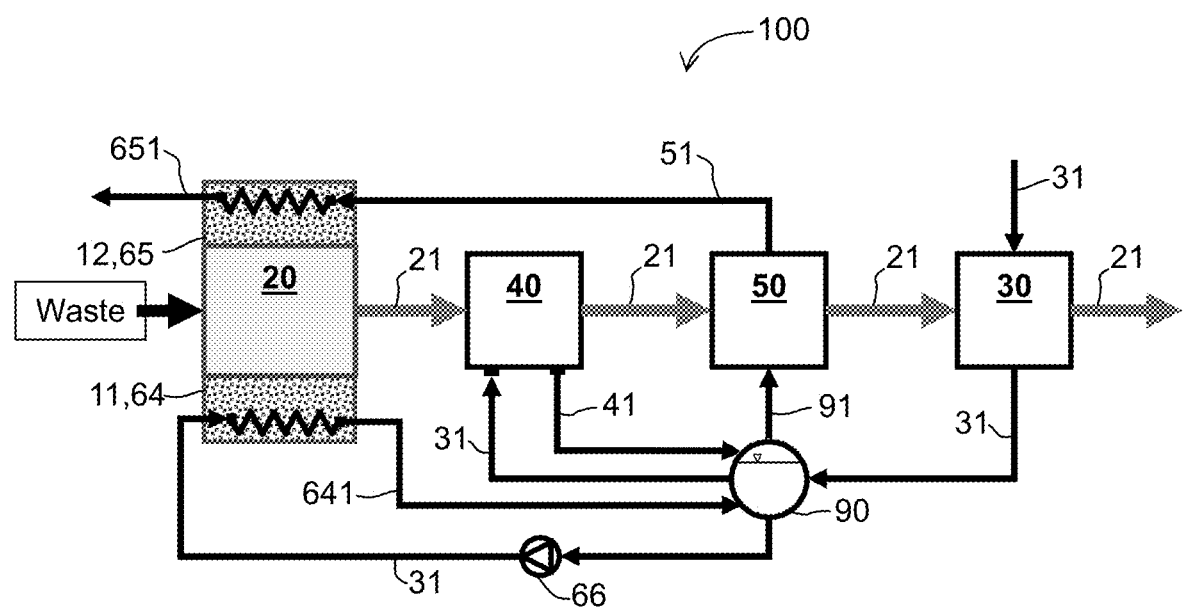
FIG. 1 is a schematic illustration of a first exemplary embodiment of a WtE plant.

Exemplary embodiments of a WtE plant 100 will be described below with reference to FIGS. 1 to 4. The same reference numerals are used in the different figures to denote the same or similar parts.

The WtE plant 100 is a PCM-based technology that exploits the working principle of thermal energy storage based on latent heat. This kind of heat storage system stores or releases latent heat when a PCM undergoes a phase transition from solid to liquid, or vice versa. The storage and release of heat occurs at the phase transition temperature of the PCM 14 in the WtE plant 100 which can be considered to be constant. This technique for heat storage allows designing thermal energy storage systems with a high energy density capable to store heat at high temperature (>300° C.). The PCM 14 used in the present WtE plant 100 is based on aluminium, its eutectic and near-eutectic alloys because they offer good thermal properties amongst high temperature PCM (Kenisarin 2010):

High thermal conductivity (solid state>200 W/mK to water state>90 W/mK);
High latent heat of fusion (280 to 560 KJ/kg)
High melting temperature (470 to 660° C.)

FIG. 1 shows a first exemplary WtE plant 100 integrating PCM-based technology with traditional heat recovery components in order to avoid fluctuation of steam production and to increase steam parameters. The traditional components include the incineration chamber 20 in which waste is combusted generating hot flue gas 21, at least one economizer 30 using heat from the hot flue gas 21 to heat feedwater 31, at least one evaporator 40 using heat from the hot flue gas 21 to produce wet steam 41 from the heated feedwater 31, and at least one superheater 50 using heat from the hot flue gas 21 to further heat dry steam 91 to a superheated steam 51. A steam drum 90 receives heated feedwater 31 from the economizer 30 and wet steam 41 from the evaporator 40, and supplies the dry steam 91 to the superheater 50 and heated feedwater 31 to the evaporator 40.

Figure 2:
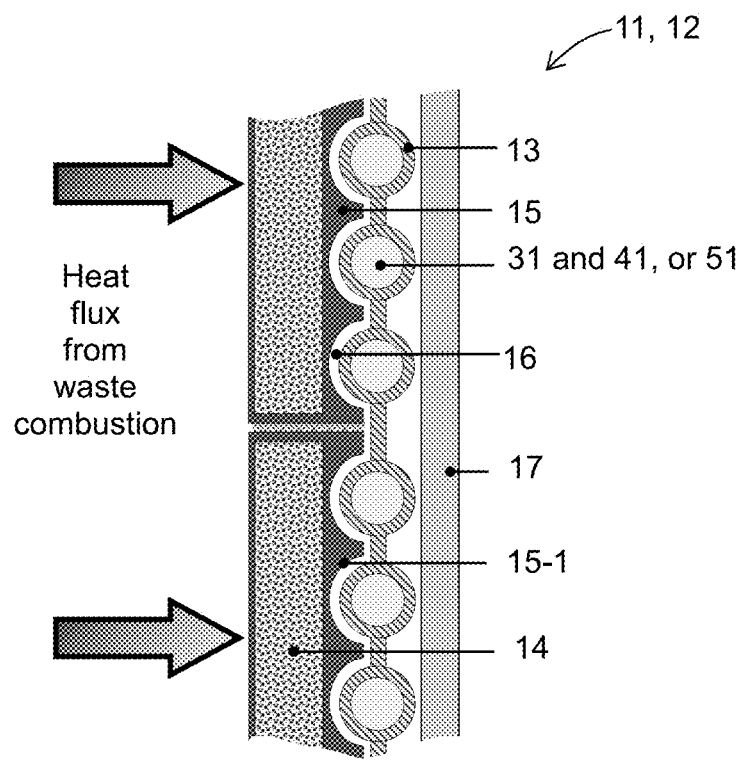
FIG. 2 is a schematic illustration of an exemplary embodiment PCM-wall of a WtE plant.

This integration is obtained by providing the incineration chamber 20 with PCM-walls 11, 12 as shown in FIG. 2. Each PCM-wall 11, 12 comprises a plurality of pipes 13 that are closely placed together for maximum heat absorption of the radiation heat from the incineration chamber 20. A layer of PCM 14 is provided between the pipes 13 and the incineration chamber 20. The PCM 14 is enveloped within a PCM-container 15. For the material of the PCM-container 15 (which can be considered as the PCM-heat exchanger), several solutions are contemplated:

Carbon steel container with $Al_2O_3$ coating, applied through an aluminizing and oxidation treatment, or WC—Co coating applied through high velocity oxygen-fuel technique (López & Rams 2015);

Ceramics characterized as inert to molten aluminium and its alloys (such as graphite, alumina-silicate refractories, AlN, $Al_2O_3$, $Si_3N_4$, and sialons) (Yan & Fan 2001);

Microencapsulation of Metal-based PCM (Nomura et al. 2015).

Each PCM-wall 11, 12 can adopt a rear-ventilated solution by maintaining an air gap 16 between the PCM-container 15 and the pipes 13. Sealing air in the air gap 16 ensures a non-corrosive atmosphere at the pipes 13 and consequently a long lifetime of the pipes 13. Alternatively, if heat transmission is preferred to or prioritized over corrosion protection, the PCM-walls 11, 12 can be installed in direct contact with the pipes 13 and the air gap 16 can be avoided or eliminated. Preferably, a surface 15-1 of the PCM-container 15 that faces the pipes 13 is shaped to conform to the shape of the pipes 13 in order to maximize heat absorption by feedwater 31 in the pipes 13. On another side of the pipes 13 away from the PCM-container 15 and PCM 14 is a layer of insulation 17 to minimize heat loss from the pipes 13.

The PCM-walls 11, 12 serve as two heat exchange components respectively: a PCM-Evaporator 64 and a PCM-Superheater 65. The PCM-walls 11, 12 store a part of the fluctuating thermal power generated by the waste combustion process. The stored thermal energy is then steadily transferred to the PCM-Superheater 65 for steam temperature increase and to the PCM-evaporator 64 for steam production control. Specifically, the PCM-Evaporator 64 receives heated feedwater 31 from the steam drum 90 via pump 66 to produce additional wet steam 641 that is fed back to the steam drum 90. The PCM-Superheater 65 receives superheated steam from the superheater 50 and further increases temperature of the superheated steam 51.

In particular, aluminium is the most suitable PCM in the PCM-Superheater 65 for steam superheating because it has the highest melting temperature (660° C.). The use of aluminium as high temperature PCM allows heating the superheated steam up to 550-600° C., thus leading to very high efficiency of the WtE plant. For steam production control, the eutectic alloy Al-12Si is more suitable as the PCM in the PCM-Evaporator 64 because of its higher latent heat of fusion (560 KJ/kg) and lower melting point (576° C.). Steam generation into the PCM-evaporator 64 can be easily managed by varying the mass flow rate of a pump 66 which connects the steam drum 90 to the PCM-evaporator 64; generated wet steam 641 from the PCM-evaporator 64 is then used to completely avoid fluctuation in steam production.

Figure 3:
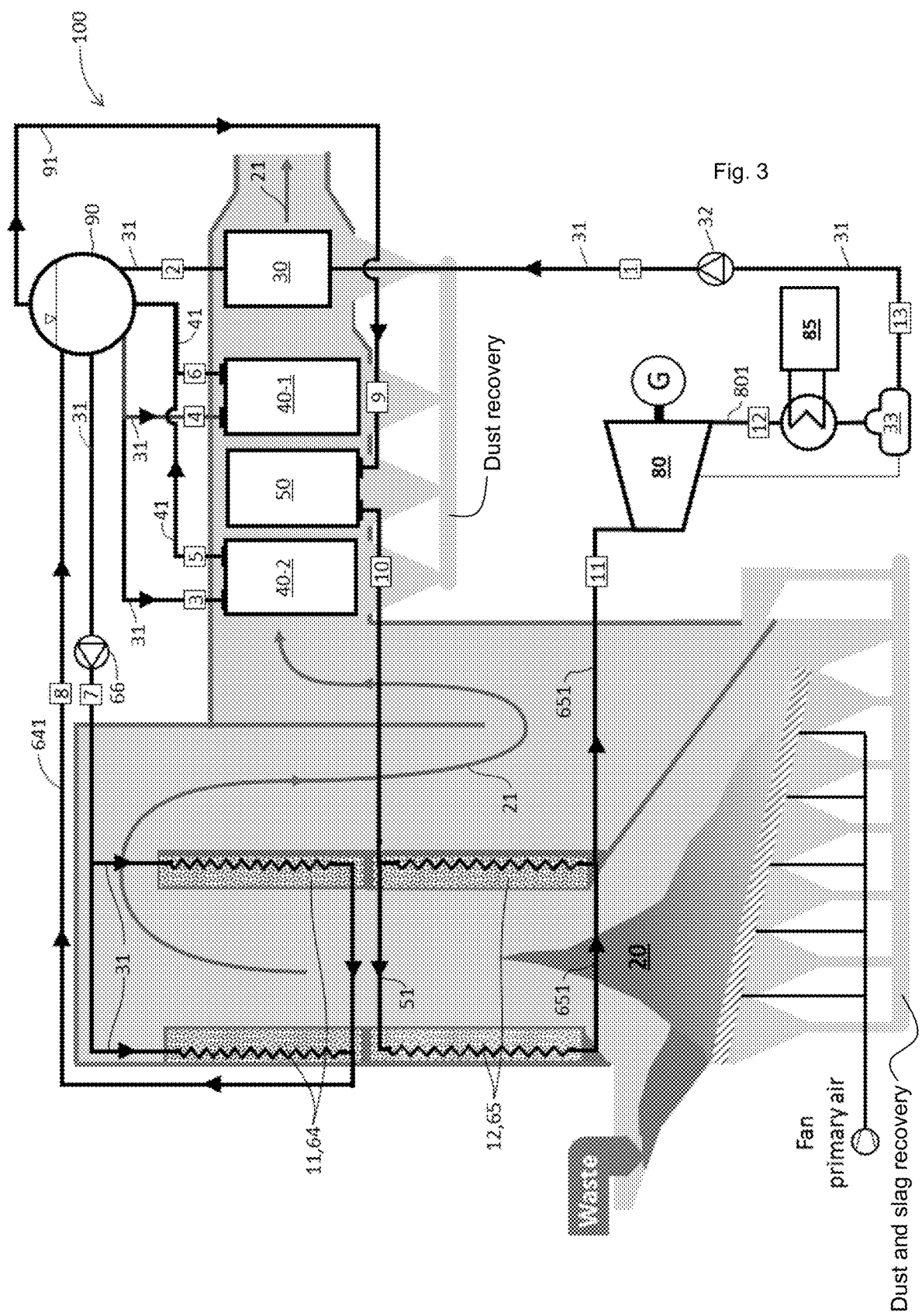
FIG. 3 is a schematic illustration of a second exemplary embodiment of a WtE plant.

FIG. 3 shows a second exemplary embodiment of the WtE plant 100 configured for obtaining high steam parameters. In the description that follows, reference numerals shown in brackets refer to reference numerals shown in rectangular boxes in FIG. 3 indicating sequential flow of the heat exchange fluid (water/steam) in the plant 100. In this embodiment, feedwater 31 is pumped (1) into an economizer 30 that heats the feedwater 31 using heat from the flue gas 21 arising from combustion in the incineration chamber 20. The heated feedwater 31 is then channelled (2) through a steam drum 90 and fed (3),(4) into two evaporators 40-1, 40-2. A mixture of water and steam 41 generated by the two evaporators 40-1, 40-2 using heat from the flue gas 21 is channelled (5), (6) back to the steam drum 90. Heated feedwater 31 in the steam drum 90 is pumped (7) through a pump 66 into a first PCM-wall 11 of the incineration chamber 20, the first PCM-wall 11 serving as a PCM-Evaporator 64. Additional steam 641 produced by the PCM- Evaporator is fed (8) into the steam drum 90. Dry steam 91 in the steam drum 90 is passed (9) into a superheater 50 for further heating using heat from the flue gas 21. Superheated steam 51 from the superheater 50 is fed (10) into a second PCM-wall 12 of the incineration chamber 20, the second PCM-wall 12 serving as a PCM-Superheater 65. The PCM-Superheater 65 additional heats the superheated steam 51 from the superheater 50 to produce superheated steam 651 at high temperature that is passed to (11) and used to drive a turbine 80. Exhaust steam 801 from the turbine 80 is passed (12) through a cooling system 85 where it is condensed and then recovered in a feedwater tank 33. Feedwater 31 from the feedwater tank 33 is channelled (13) into a feedwater pump 32 that pumps (1) the feedwater 31 into the economizer 30.

Figure 4:
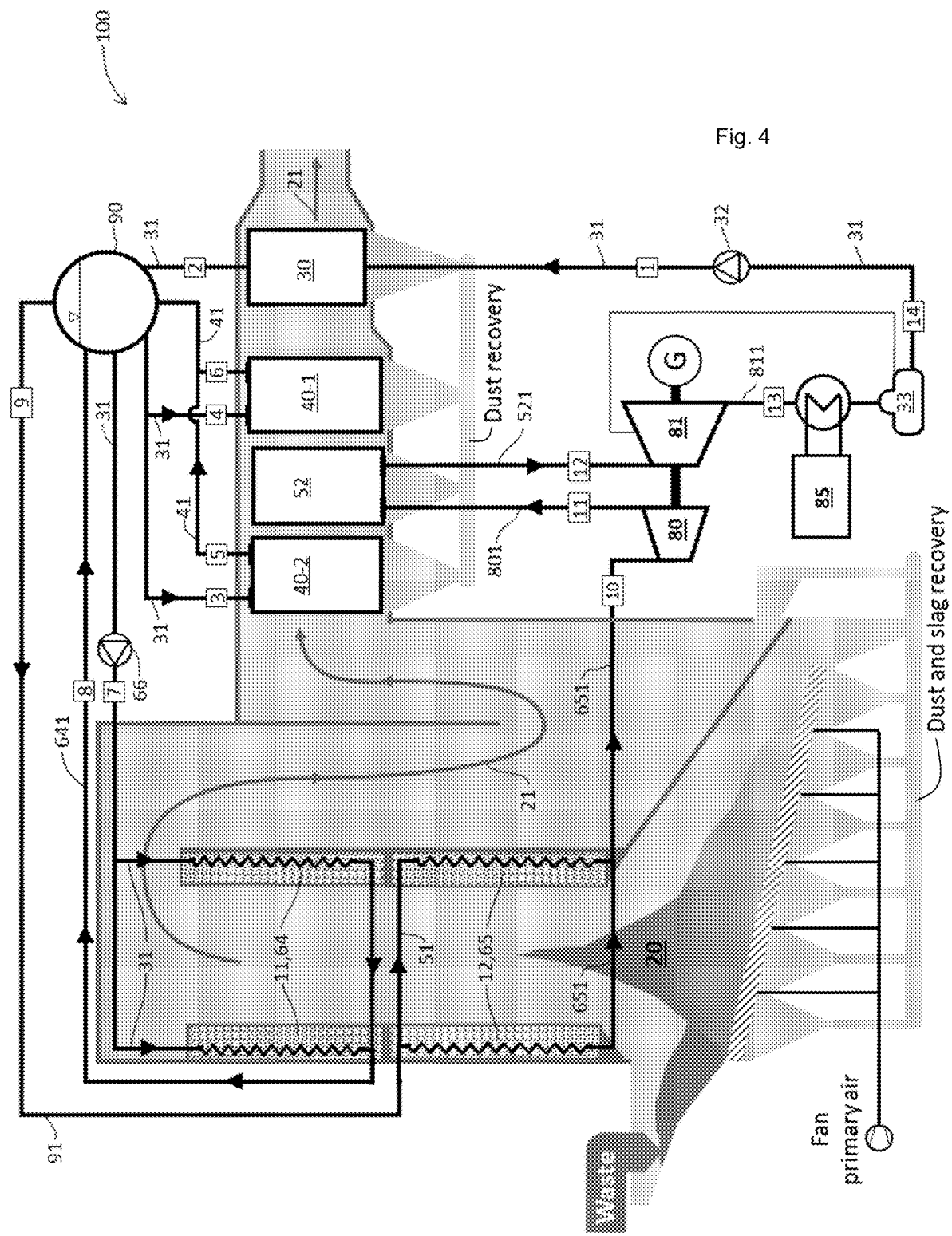
FIG. 4 is a schematic illustration of a third exemplary embodiment of a WtE plant.

In a third exemplary embodiment of the WtE plant 100 that includes a steam reheating cycle as shown in FIG. 4, feedwater 31 is pumped into an economizer 30 that heats the feedwater 31 using heat from the flue gas 21 arising from combustion in the incineration chamber 20. The heated feedwater 31 is then channelled through a steam drum 90 into two evaporators 40-1, 40-2. A mixture of water and steam generated by the two evaporators 40-1, 40-2 using heat from the flue gas 21 is channelled through the steam drum 90. Feedwater 31 is pumped through a pump 66 into a first PCM-wall 11 of the incineration chamber 20, the first PCM-wall 11 serving as a PCM-Evaporator 64. Additional steam 641 produced by the PCM-Evaporator 64 is fed into the steam drum 90. Dry steam 91 from the steam drum 90 is passed into the second PCM-wall 12 serving as a PCM-Superheater 65 to additionally heat the steam. Additionally heated steam 651 (that may have a pressure of about 90 bar and a temperature of about 600°) from the PCM-Superheater 65 is passed to (11) and used to drive a high-pressure turbine 80. Output steam 801 (that may have a pressure of about 23 bar and a temperature of about 260° C.) from the high-pressure turbine 80 is passed (11) into a low-pressure superheater 52 which reheats the steam using heat from the flue gas 21. Output reheated steam 521 (that may have a pressure of about 23 bar and a temperature of about 420° C.) from the low-pressure superheater 52 is used to drive a low-pressure turbine 81. Exhaust steam 811 from the low-pressure turbine 81 passes (13) through passed through a cooling system 85 where it is condensed and then recovered in a feedwater tank 33. Feedwater 31 from the feedwater tank 33 is channelled (14) into a feedwater pump 32 that pumps (1) the feedwater 31 (that may have a pressure of about 90 bar and a temperature of about 130° C.) into the economizer 30.

Table 2 below shows an exemplary WtE plant 100 configuration using PCM-based technology for steam superheating and steam production control.

TABLE 2

| Waste Incineration | | |
| --- | --- | --- |
| Average Low Heating Value, LHV | kJ/kg | 8,500 |
| Treatment capacity | t/d | 2,000 |
| Number of Incineration lines | — | 2 |
| Mass flow per line, $\dot{m}_w$ | kg/s | 11.6 |
| Combustion efficiency, $n_c$ | — | 0.9 |
| Waste combustion thermal power, $\dot{Q}_w$ | kW | 88,542 |
| Incineration chamber temperature, $T_{cc}$ | ° C. | 1100 |
| Thermal power fluctuation, $F_\%$ | % | 3 |
| Fluctuation period, $T_f$ | h | 3 |

TABLE 2-continued

| PCM Evaporator (PEV) | | |
| --- | --- | --- |
| PCM | — | Al-Si12 |
| PCM Melting temperature, , $T_{m,PEV}$ | ° C. | 576 |
| PCM Latent heat, $T_{wall,PEV}$ | kJ/kg | 560 |
| PCM Density, $\rho_{PEV}$ | kg/m³ | 2700 |
| Steam Temperature Inlet, $T_8$ | ° C. | 300 |
| Steam Temperature Inlet, $T_9$ | ° C. | 300 |
| Steam pressure, $P_s$ | Bar | 90 |
| Refractory tile temperature, $T_{rt,PEV}$ | ° C. | 800 |
| Thermal power to absorb, $\dot{Q}_{PEV}$ | kW | 2,656 |
| Required Exchange area, $A_{PEV}$ | m² | 73 |
| Thermal fluctuation to avoid, $\dot{F}_{PEV}$ | kW | 2,656 |
| Energy to store into PCM, $E_{PEV}$ | kWh | 1114 |
| PCM Mass, $M_{PEV}$ | kg | 7159 |
| PCM Volume, $V_{PEV}$ | m³ | 2.7 |
| Number of walls, $n_{w,PEV}$ | — | 4 |
| Exchange area per wall, $A_{w,PEV}$ | m² | 18.2 |
| PCM Thickness, $t_{w,PEV}$ | m | 0.15 |
| PCM Superheater (PSH) | | |
| PCM | — | Aluminium |
| PCM Melting temperature, , $T_{m,PSH}$ | ° C. | 660 |
| PCM Latent heat, $T_{wall,PSH}$ | kJ/kg | 396 |
| PCM Density, $\rho_{PSH}$ | kg/m³ | 2700 |
| Steam Temperature Inlet, $T_{11}$ | ° C. | 400 |
| Steam Temperature Inlet, $T_{12}$ | ° C. | 600 |
| Steam pressure, $P_s$ | Bar | 90 |
| Refractory tile temperature, $T_{rt,PSH}$ | ° C. | 900 |
| Thermal power to absorb, $\dot{Q}_{PSH}$ | kW | 12,806 |
| Required Exchange area, $A_{PSH}$ | m² | 249 |
| Thermal fluctuation to avoid, $\dot{F}_{PSH}$ | kW | 2,656 |
| Energy to store into PCM, $E_{PSH}$ | kWh | 996 |
| PCM Mass, $M_{PSH}$ | kg | 9,055 |
| PCM Volume, $V_{PSH}$ | m³ | 3.7 |
| Number of walls, $n_{w,PSH}$ | — | 4 |
| Exchange area per wall, $A_{w,PSH}$ | m² | 62.1 |
| PCM Thickness, $t_{w,PSH}$ | m | 0.05 |

The above described WtE plant 100 integrating PCM-walls 11, 12 not only uses PCM 14 as a heat storage system but also exploits the PCM 14 as an interface between the heat source (i.e. waste incineration in the incineration chamber 20) and the heat transfer fluid (i.e. water 31/steam 41, 641, 51, 651). This additional characteristic allows decoupling of the heat exchange between the heat source and the heat transfer fluid, which means that the thermal behaviour of both the heat source and the heat transfer fluid depends only on the melting temperature of the PCM 14. Thus, this feature of the PCM-walls 11, 12, combined with the feature of heat storage, enables controlling superheated steam temperature and mass flow rate in the WtE plant 100, while increasing waste combustion control. In particular, it provides the following advantages (in order of importance):

I. The presently disclosed WtE plant 100 allows the installation of additional superheaters (i.e. PCM-Superheaters 65) in the incineration chamber 20, where the temperature of the heat source (waste combustion) is highest. This particular arrangement enables the generation of superheated steam at a higher temperature than that achievable in current WtE plants. In fact, the closer to the heat source is the superheater, the higher the steam temperature and the overall efficiency of the WtE plant. It is worth noting that in current WtE plants, the installation of superheaters within the incineration chamber is hindered by the thermal power fluctuations, which lead to uncontrollable overheating of the tubes and consequent tube failure, resulting in additional maintenance costs and shutdown of the plant. Currently, only the radiant evaporators (i.e. the water-walls) can operate properly within the incineration chamber since they work at constant temperature (evaporation temperature) exploiting the water vaporisation (characterized by high value of latent heat).

II. The presently disclosed WtE plant 100 provides an additional degree of freedom on control systems, which allow optimization of the waste combustion control without affecting the steam production (as currently occurs in WtE plants). This feature leads to increase of the waste throughput while increasing the overall energy efficiency of the whole plant 100. Both the PCM-evaporator 64 and the PCM-superheater 65 have this feature.

III. The presently disclosed WtE plant 100 absorbs directly a part of the thermal power fluctuation from the incineration chamber 20, thereby allowing the downstream heat recovery components (evaporator 40, superheater 50 and economizer 30) to operate with a lower thermal power fluctuation, thus increasing their lifetime.

Table 2 below shows a comparison between a latest prior art configuration to improve WtE plant efficiency and the presently disclosed WtE 100 adopting the PCM-based technology. The comparison is based on the methodology described in (Main, Armin Maghon 2010) and it considers as a baseline (under the column "Basis") the typical WtE plant configuration (i.e., 400° C. at 40 bar). It can be clearly seen that the presently disclosed WtE 100 adopting PCM-based technology can achieve a steam temperature up to 600° C. leading to a dramatic increase in gross electrical efficiency up to 31.4%.

feedwater and a heat exchanger preheating primary and secondary air may be provided.

The invention claimed is:

1. A Waste-to-Energy plant comprising:
   an incineration chamber in which waste is combusted generating hot flue gas;
   at least one economizer to heat feedwater using heat from the hot flue gas;
   at least one evaporator to produce steam from the heated feedwater using heat from the hot flue gas;
   at least one steam drum configured to receive the heated feedwater from the at least one economizer and to serve as a supply of heated feedwater, the at least one steam drum further configured to receive the steam from the at least one evaporator and to serve as a supply of steam; and
   at least one superheater to receive the steam from the at least one steam drum and to further heat the steam to a superheated steam using heat from the hot flue gas;
   wherein the incineration chamber comprises a first phase change material (PCM)-wall and a second PCM-wall each comprising a plurality of pipes and a layer of PCM provided between the pipes and the incineration chamber, the plurality of pipes in the first PCM-wall receiving the heated feedwater from the steam drum and producing steam in the plurality of pipes in the first PCM-wall using radiant heat from the incineration chamber, and the second PCM-wall heating steam in the plurality of pipes of the second PCM-wall using radiant heat from the incineration chamber.

2. The plant of claim 1, wherein the PCM comprises one of: aluminium and an inorganic eutectic aluminium alloy.

3. The plant of claim 1, wherein the steam in the plurality of pipes of the second PCM-wall is superheated steam from the at least one superheater.

4. The plant of claim 1, wherein the superheater is a low-pressure superheater, the steam in the plurality of pipes of the second PCM-wall is the steam supplied from the

TABLE 2

|  |  | Basis | State of the art |  |  |  |  |
|---|---|---|---|---|---|---|---|
|  |  |  | Flue Gas Cooler | External Superheating | High steam parameters | Steam reheating | PCM superheating |
| Temperature Live Steam | ° C. | 400 | 400 | 520 | 500 | 420 | 600 |
| Pressure Live Steam | Bar | 40 | 40 | 90 | 90 | 90 | 90 |
| Flue Gas Temp. Boiler Outlet | ° C. | 190 | 100 | 190 | 190 | 190 | 190 |
| Excess Air | % | 60 | 60 | 60 | 60 | 60 | 60 |
| Gross electrical efficiency | % | 26.4 | 28.1 | 29.7 | 30.2 | 29.9 | 31.4 |
| Electrical Power Production |  | 0 | + | ++ | ++ | ++ | +++ |
| Costs for Consumables |  | 0 | 0 | -- | 0 | 0 | 0 |
| Life Time of Superheaters |  | 0 | 0 | 0 | − | − | 0 |
| Cost for Investment |  | 0 | 0 to − | 0 to − | 0 to − | − | − |
| Maintenance Costs |  | 0 | 0 | 0 | − | 0 to − | 0 |
| Availability |  | 0 | 0 | 0 | − | 0 to − | 0 |
| Continuous Operation Period |  | 0 | 0 | 0 | − | 0 | 0 |

0 baseline
= comparable
+ positive
++ very positive
+++ breakthrough
− negative
-- very negative Whilst there has been described in the foregoing description exemplary embodiments of the present invention, it will be understood by those skilled in the technology concerned that many variations and combination in details of design, construction and/or operation may be made without departing from the present invention. For example, the number of economizers, evaporators, superheaters, and steam drums may be varied as desired from the numbers disclosed for the embodiments described above. For example, further flue gas cooling by means of an external economizer heating boiler steam drum, superheated steam from the second PCM-wall is passed through a high pressure turbine, the superheater receives and reheats steam from the high pressure turbine, and reheated steam from the superheater is passed through a low pressure turbine.

5. The plant of claim 1, further comprising a pump to control mass flow rate of steam between the first PCM-wall and the steam drum.

6. The plant of claim 1, wherein for at least one of the first PCM-wall and the second PCM-wall, the layer of PCM is enveloped within a PCM-container and the PCM-container is made of carbon steel having an Al2O3 coating.

7. The plant of claim 6, wherein a surface of the PCM-container facing the plurality of pipes is shaped to conform to a shape of the plurality of pipes.

8. The plant of claim 1, wherein for at least one of the first PCM-wall and the second PCM-wall, an air gap is provided between the layer of PCM and the plurality of pipes.

* * * * *